United States Patent
Kim et al.

(10) Patent No.: US 9,880,350 B2
(45) Date of Patent: Jan. 30, 2018

(54) DISPLAY DEVICE INCLUDING LOWER FRAME HAVING ACCOMODATION PORTION EXTENDED FROM BOTTOM PORTION

(71) Applicant: Samsung Display Co., Ltd., Yongin-Si, Gyeonggi-Do (KR)

(72) Inventors: Hyoungjoo Kim, Anyang-si (KR); Dongyeon Kang, Seoul (KR); Minyoung Song, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 41 days.

(21) Appl. No.: 15/053,015

(22) Filed: Feb. 25, 2016

(65) Prior Publication Data

US 2016/0282551 A1    Sep. 29, 2016

(30) Foreign Application Priority Data

Mar. 25, 2015   (KR) .................. 10-2015-0041620

(51) Int. Cl.
*F21V 7/04*   (2006.01)
*F21V 8/00*   (2006.01)

(52) U.S. Cl.
CPC ......... *G02B 6/0091* (2013.01); *G02B 6/0031* (2013.01); *G02B 6/0045* (2013.01); *G02B 6/0085* (2013.01)

(58) Field of Classification Search
CPC ......... G02F 1/133608; G02F 1/133308; G02F 2001/133314

USPC .......................................... 362/633
See application file for complete search history.

(56) References Cited

U.S. PATENT DOCUMENTS

| | | | |
|---|---|---|---|
| 5,666,172 A * | 9/1997 | Ida ................... | G01D 11/28 349/58 |
| 2011/0007236 A1 | 1/2011 | Kim et al. | |
| 2014/0016349 A1 | 1/2014 | Minoura | |

FOREIGN PATENT DOCUMENTS

| | | |
|---|---|---|
| JP | 2007207615 A | 8/2007 |
| KR | 1020090054722 A | 6/2009 |
| KR | 102011004995 A | 1/2011 |
| KR | 1020120028134 A | 3/2012 |
| KR | 1020120103257 A | 9/2012 |
| KR | 1020120122654 A | 11/2012 |
| KR | 1020140018045 A | 2/2014 |

* cited by examiner

*Primary Examiner* — Jamara Franklin
(74) *Attorney, Agent, or Firm* — Cantor Colburn LLP

(57) ABSTRACT

A display device includes: a display panel which display an image using light; a light source which generates and provides the light to the display panel; a circuit board on which the light source is mounted; a fixation frame on which the light source and the circuit board are disposed; and a lower frame on which the display panel is disposed and in which the light source, the circuit board and the fixation frame are disposed. The lower frame defines: a bottom portion thereof overlapping the display panel, and an accommodation portion thereof extending from an end portion of the bottom portion and on which the light source, the circuit board and the fixation frame are disposed. The circuit board extends to cover the accommodation portion.

14 Claims, 4 Drawing Sheets

DISPLAY DEVICE INCLUDING LOWER FRAME HAVING ACCOMODATION PORTION EXTENDED FROM BOTTOM PORTION

This application claims priority to Korean Patent Application No. 10-2015-0041620, filed on Mar. 25, 2015, and all the benefits accruing therefrom under 35 U.S.C. §119, the disclosure of which is incorporated herein in its entirety by reference.

BACKGROUND

1. Field

Embodiments of the invention relate to a display device having improved efficiency of light incident to a light guide plate thereof

2. Description of the Related Art

A liquid crystal display ("LCD") device is one among flat panel displays ("FPDs"), which has been applied in a wide variety of applications. The LCD includes two display substrates including electrodes therein and a liquid crystal layer interposed between the two display substrates. Upon applying voltage to the electrodes, orientations of liquid crystal molecules of the liquid crystal layer are rearranged, such that an amount of light transmitted therethrough may be adjusted.

An LCD device, which is a passive light emitting device, may include a display panel which is configured to display images on a screen and a backlight assembly which is configured to provide light to the display panel. The backlight assembly may be categorized into a direct type, an edge type and a corner type, based on the position of a light source.

SUMMARY

One or more exemplary embodiments of the invention are directed to a display device improved in mitigating a hot spot and light leakage occurring in an accommodation portion thereof in which a light source unit disposed.

According to an exemplary embodiment, a display device includes: a display panel which display an image using light; a light source which generates and provides the light to the display panel; a circuit board on which the light source is mounted; a fixation frame on which the light source and the circuit board are disposed; a lower frame on which the display panel is disposed and in which the light source, the circuit board and the fixation frame are disposed, the lower frame defining: a bottom portion thereof overlapping the display panel, and an accommodation portion thereof extending from an end portion of the bottom portion and on which the light source, the circuit board and the fixation frame are disposed. The circuit board extends to cover the accommodation portion.

The accommodation portion on which are disposed the light source, the circuit board and the fixation frame may be extended in a different plane than that of the bottom portion which overlaps the display panel.

The circuit board which covers the accommodation portion may be in contact with the end portion of the bottom portion from which the accommodation portion extends.

The display device may further include a fixation tape disposed on the circuit board to be adjacent to the light source mounted on the circuit board.

The light source may be provided in plural on the circuit board, and the fixation tape may be disposed between adjacent light sources mounted on the circuit board.

The display device may further include a light guide plate disposed between the lower frame and the display panel. The light guide plate may direct light emitted from the light source toward the display panel.

The fixation tape may be disposed between the light guide plate and the circuit board.

The lower frame may further define: a lateral wall portion thereof extended at a first end thereof away from the accommodation portion which is extended from the bottom portion defined by the lower frame; and a panel support thereof extending from a second end of the lateral wall portion opposite to the first end thereof, the panel support extended parallel to the accommodation portion.

The light source, the circuit board, and the fixation frame may each be disposed between the panel support and the accommodation portion which is defined by the lower frame.

The light source may be disposed between the circuit board and the panel support which is defined by the lower frame.

The circuit board which covers the accommodation portion may be disposed between the light source and the fixation frame.

The fixation frame may be disposed between the circuit board which covers the accomodation portion and the accommodation portion.

In a cross-section, the fixation frame may define an inclined portion thereof extending away from the bottom portion which is defined by the lower frame to form an acute angle with the accommodation portion which is defined by the lower frame.

The inclined portion which is defined by the fixation frame may be in contact with the end portion of the bottom portion from which the accommodation portion extends.

A distance between the adjacent light sources mounted on the circuit board may be defined in a length direction of the circuit board. A length of the fixation tape may be taken in a width direction of the circuit board, the width direction being perpendicular to the length direction. The length of the fixation tape may be from about 0.1 to about 0.28 times the distance between the adjacent light sources mounted on the circuit board.

The circuit board may further include a reflective surface disposed in the light emitting direction of the light source which is mounted on the circuit board.

The display device may further include a fixation tape disposed on the reflective surface.

According to one or more exemplary embodiments of the invention, an improved display device may reduce a hot spot appearing at an accommodation portion on which a light source unit is disposed, mitigate light leakage therein, and enhance efficiency of light incident to a light guide plate.

The foregoing is illustrative only and is not intended to be in any way limiting.

In addition to the illustrative exemplary embodiments and features described above, further exemplary embodiments and features will become apparent by reference to the drawings and the following detailed description.

BRIEF DESCRIPTION OF THE DRAWINGS

The above and other features of the invention will be more clearly understood from the following detailed description taken in conjunction with the accompanying drawings, in which.

DETAILED DESCRIPTION

Figure 1:
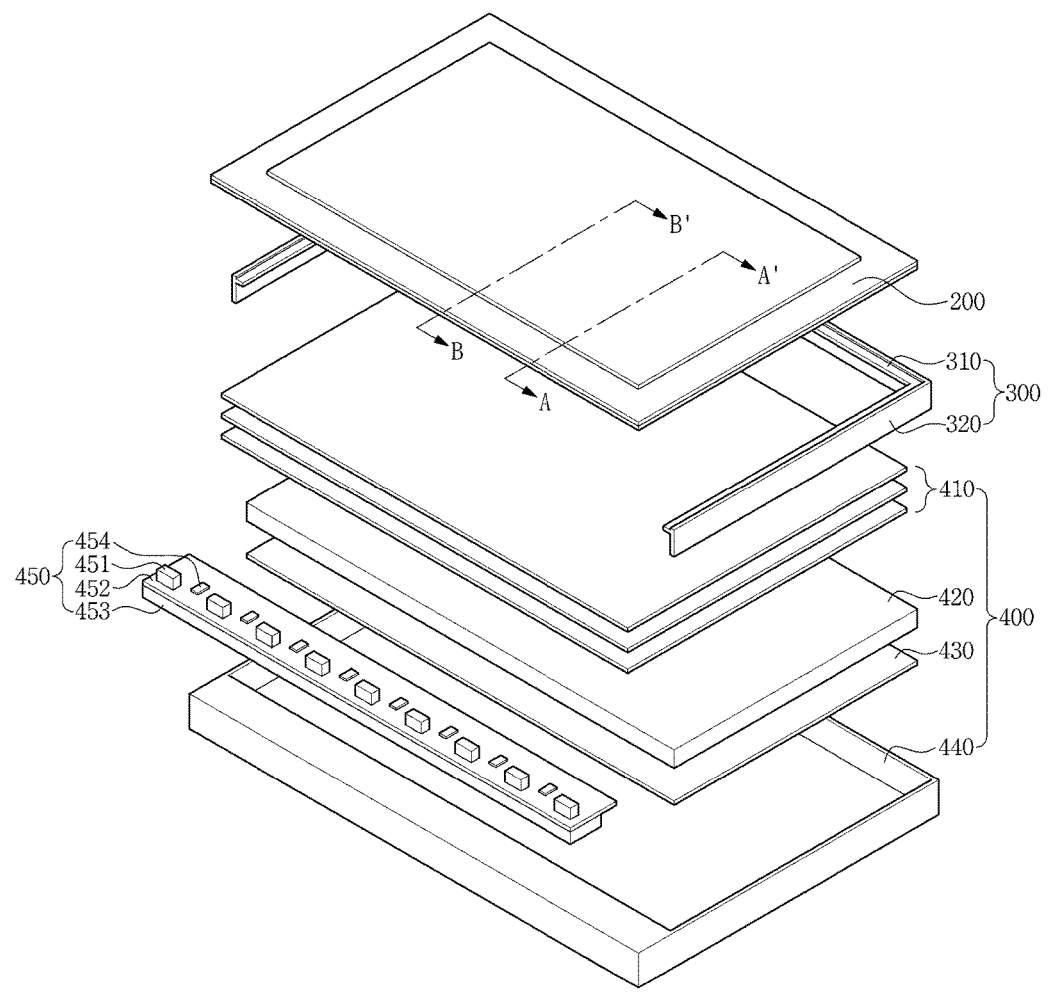
FIG. 1 is a schematic exploded perspective view illustrating an exemplary embodiment of a display device according to the invention.

Advantages and features of the invention and methods for achieving them will be made clear from exemplary embodiments described below in detail with reference to the accompanying drawings. The invention may, however, be embodied in many different forms and should not be construed as being limited to the embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe embodiments of the invention and may be modified according to the relevant art and the intention of an applicant. Therefore, the terms used herein should be interpreted as having a meaning that is consistent with their meanings in the context of the present disclosure, and is not intended to limit the invention.

As used herein, the singular forms "a," "an" and "the" are intended to include the plural forms as well, unless the context clearly indicates otherwise. As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

With the trend toward a relatively slim-sized display device, a light source unit is disposed in an accommodation portion of a lower frame of the display device to reduce an overall thickness of the display device. The accommodation portion of the lower frame disposed at a lower plane than a bottom portion of the lower frame defines a recessed portion of the lower frame, and the light source unit disposed in the recessed accommodation portion reduces the overall thickness of the display device.

As the light source unit is disposed in the accommodation portion of the lower frame, a fraction of light incident to a light guide plate which is disposed in the bottom portion of the display device may be reflected at the accommodation portion to be dissipated outwards therefrom, thus undesirably incurring a hot spot and light leakage in the accommodation portion in which the light source unit disposed. Therefore, there remains a need for an improved display device in which a hot spot and light leakage at a lower frame accommodation portion are reduced or effectively prevented.

Hereinafter, an exemplary embodiment of a display device according to the invention is described below in detail with reference to FIGS. 1 through 4.

Figure 2:
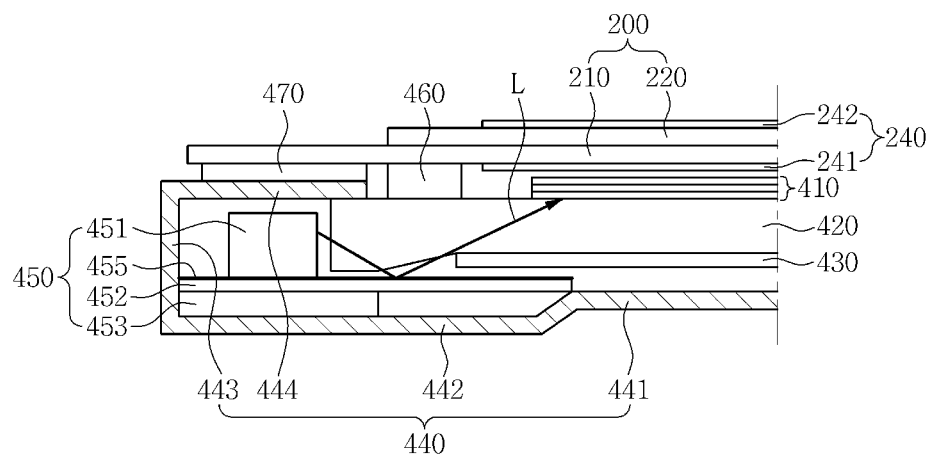
FIG. 2 is a cross-sectional view taken along line A-A' of FIG. 1.
Figure 3:
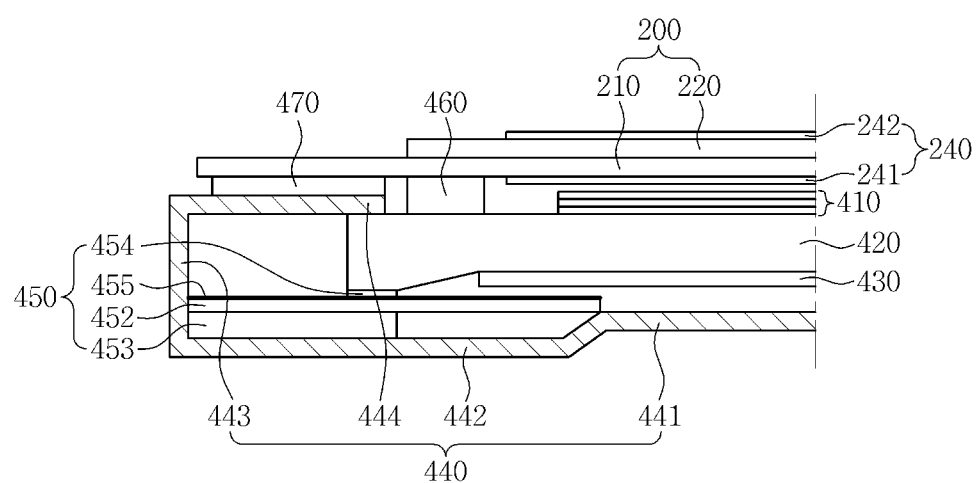
FIG. 3 is a cross-sectional view taken along line B-B' of FIG. 1.
Figure 4:
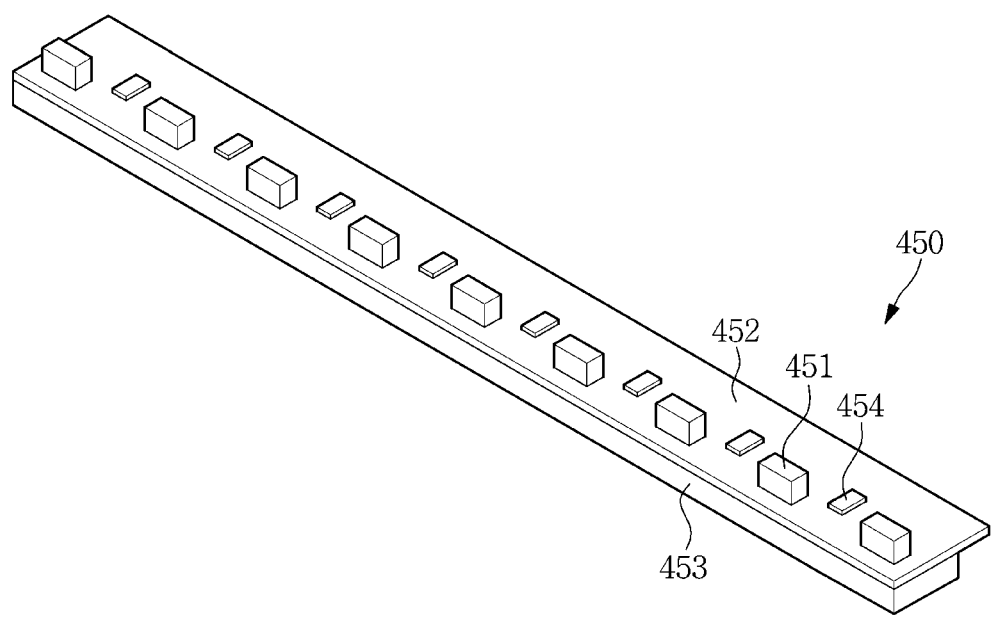
FIG. 4 is a schematic perspective view illustrating an exemplary embodiment of a light source unit of FIG. 1.
Figure 5:
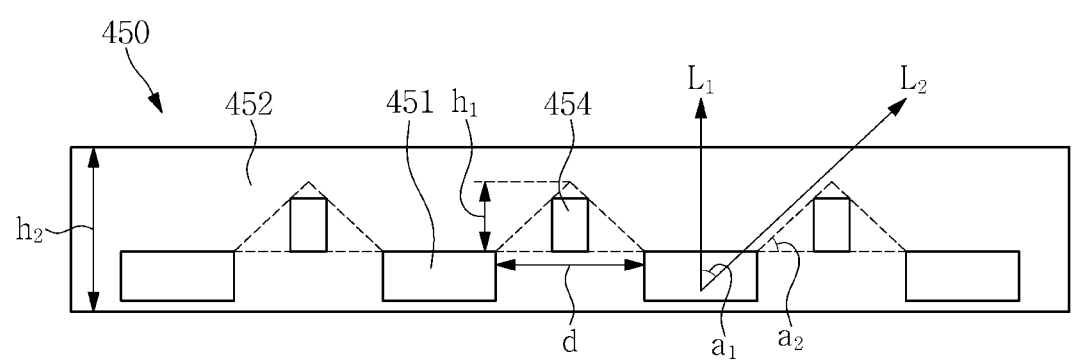
FIG. 5 is a schematic plan view illustrating dimensions and light paths within an exemplary embodiment of a light source unit of FIG. 1.

FIG. 1 is a schematic exploded perspective view illustrating an exemplary embodiment the display device according to the invention. FIG. 2 is a cross-sectional view taken along line A-A' of FIG. 1. FIG. 3 is a cross-sectional view taken along line B-B' of FIG. 1. FIG. 4 is a schematic perspective view illustrating an exemplary embodiment of a light source unit of FIG. 1. FIG. 5 is a schematic plan view illustrating dimensions and light paths within an exemplary embodiment of a light source unit of FIG. 1.

Referring to FIGS. 1 and 2, the display device may include a display panel 200 configured to display images, a backlight assembly 400 configured to provide light to the display panel 200, and a middle frame 300 on which the display panel 200 is mounted.

The display panel 200 is configured to display images using light. The display panel 200 may be a light-receiving type display panel and may be categorized into a liquid crystal display ("LCD") panel, an electrowetting display panel, an electrophoretic display panel, a microelectromechanical system ("MEMS") display panel, and the like. By way of example, the exemplary embodiment will be described based on the LCD panel, but the invention is not limited thereto.

The display panel 200 may be provided in a quadrilateral plate form having two pairs of parallel sides. According to the exemplary embodiment, the display panel 200 may be a rectangular in shape having a pair of long sides and a pair of short sides. The display panel 200 may include a first display substrate 210, a second display substrate 220 opposed to the first display substrate 210, and a liquid crystal layer (not illustrated) interposed between the first and second display substrates 210 and 220. The display panel 200, when viewed in a plane (e.g., a top plan view), may have a display area (not illustrated) in which an image is displayed and a non-display area (not illustrated) which surrounds the display area and in which an image is not displayed. The non-display area may be covered (e.g., overlapped) by an upper frame (not illustrated).

The display panel 200 may be mounted on a panel support 444 of a lower frame 440 and a support 310 of the middle frame 300 such as by using an adhesive member 470. In an exemplary embodiment, the adhesive member includes a double-sided tape 470 interposed between the display panel 200 and the panel support 444 and between the display panel 200 and the support 310. Further, the display panel 200 may be mounted on a light guide plate 420 such as by using a buffer member 460 interposed therebetween. The buffer member 460 may reduce or effectively prevent damage to the display panel 200 and the light guide plate 420, which may be caused by an impact externally inflicted thereto.

The first display substrate 210 may include disposed therein a plurality of pixel electrodes (not illustrated) and a plurality of thin film transistors ("TFTs", not illustrated) which is electrically connected to the pixel electrodes in one-to-one correspondence. A data line may be connected to a source electrode of a TFT, a gate line may be connected to a gate electrode thereof, and a pixel electrode may be connected to a drain electrode thereof. Each TFT may function as a switch for applying a driving signal applied to the corresponding pixel electrode to which the TFT is connected. Further, the second display substrate 220 may include disposed therein a common electrode (not illustrated) which forms an electric field along with the pixel electrodes, where the electric field controls an arrangement of the liquid crystals of the liquid crystal layer. The display panel 200 may be configured to drive the liquid crystal layer to display an image frontwards, such as at a screen side of the display device.

The display panel 200 may include a driving chip (not illustrated) configured to generate and apply a driving signal; a driving-chip mounting film (not illustrated) on which the driving chip is mounted; and a printed circuit board (not illustrated) electrically connected to the display panel 200 through the driving-chip mounting film.

The driving-chip mounting film may be a tape carrier package "TCP") but the invention is not limited thereto.

The driving chip may generate a driving signal for driving the display panel 200 in response to an external signal applied to the driving chip. The external signal may be supplied from the printed circuit board and may include an image signal, multiple control signals and/or a driving voltage.

In an exemplary embodiment, for example, a gate printed circuit board may be connected to a gate driving-chip mounting film. The gate printed circuit board may supply an image signal to a gate driving chip. A data printed circuit board may be connected to a data driving-chip mounting film. The data printed circuit board may supply an image signal to a data driving chip.

The gate driving chip may receive the image signal and apply a gate driving signal to a gate line within the display panel 200. The data driving chip may receive the image signal and apply a data driving signal to a data line within the display panel 200.

Polarizers 240 may be disposed on opposite sides of the display panel 200 and may include first and second polarizers 241 and 242. The first and second polarizers 241 and 242 may be disposed on the opposite sides of the first and second display substrates 210 and 220, respectively. That is, the first polarizer 241 may be attached on an outer (lower) side of the first display substrate 210 and the second polarizer 242 may be attached on an outer (upper) side of the second display substrate 220. A transmission axis of the first polarizer 241 may be substantially at a right angle (e.g., perpendicular) to a transmission axis of the second polarizer 242.

The middle frame 300 may be coupled to the lower frame 440 and the coupled middle and lower frames 300 and 440 may accommodate the display panel 200 therein. The middle frame 300 may include the support 310 on which the display panel 200 is disposed and a lateral surface portion 320 extending from an end surface of the support 310. The middle frame 300 may include or be formed of a flexible material such as plastic, in order to reduce or effectively prevent damage to the display panel 200.

The middle frame 300 may be provided along an edge portion of the display panel 200 to face a lower surface of the display panel and may support the display panel 200 from a lower portion thereof. The middle frame 300 may be provided in areas corresponding to each four sides or less than four sides of the display panel 200. In an exemplary embodiment, for example, the middle frame 300, as illustrated in FIG. 1, may have an open loop shape formed by a quadrilateral open-loop corresponding to three sides of the edge portion of the display panel 200 among four sides thereof. Alternatively, the middle frame 300 may have a quadrilateral closed-loop form corresponding to each of four sides of the edge portion the display panel 200.

The backlight assembly 400 may include an optical sheet 410, the light guide plate 420, a reflection sheet 430, the lower frame 440 and a light source unit 450.

The optical sheet 410 may be disposed on the light guide plate 420 and may be configured to diffuse and/or collimate light directed from the light guide plate 420. The optical sheets 410 may include one or more among a diffusion sheet, a prism sheet, a protective sheet and other functional sheets.

The diffusion sheet may be configured to disperse light incident from the light guide plate 420 so as to reduce or effectively prevent the light from being partly concentrated.

The prism sheet may include prisms defined therein that have a triangular cross-section and are arranged in a predetermined array on one surface of the prism sheet. The prism sheet may be disposed on the diffusion sheet and may collimate light diffused from the diffusion sheet in a direction perpendicular to the display panel 200.

The protective sheet may be disposed on the prism sheet and may serve to protect a surface of the prism sheet and diffuse light to achieve uniform light distribution therefrom.

The light guide plate 420 may allow light emitted from the light source 451 to be incident on a light incident lateral surface thereof and to be directed toward a light emitting surface thereof. The light emitting surface of the light guide plate 420 faces the display panel 200. The light guide plate 420 may be configured to uniformly supply light incident thereto from the light source unit 450 to the display panel 200.

The light guide plate 420 may be disposed adjacent to the light source unit 450 and may be accommodated in the lower frame 440. The light guide plate 420 may be attached to circuit board 452 with an adhesive member such as a fixation tape 454 interposed therebetween. The light guide plate 420 may be provided, for example, in a quadrilateral plate form similar to that of the display panel 200, but is not limited thereto.

In some exemplary embodiments, when a light emitting diode ("LED") is used as the light source 451, the light guide plate 420 may have various forms including a form in which is defined a predetermined groove and/or a protrusion according to the position of the light source 451.

Although referred to as a plate having a relatively large cross-sectional thickness for ease of description, the light guide plate 420 may be provided in a shape of a sheet or a film which have a relatively small thickness as compared to the plate, thus realizing a relatively slim display device. That is, the light guide plate 420 is to be understood as having a form including but not limited to a plate and a film each of which guides light from the light source unit 450 to the display panel 200.

The light guide plate 420 may include or be formed of a light-transmissive material. The light-transmissive material may include, for example, an acrylic resin, such as polymethylmethacrylate ("PMMA"), or polycarbonate ("PC") so as to guide light efficiently.

A pattern may be defined on at least one surface of the light guide plate 420.

In an exemplary embodiment, for example, a scattering pattern (not illustrated) may be defined in a lower surface thereof, so as to scatter and/or reflect the guided light upwards.

The reflection sheet 430 may be disposed between the light guide plate 420 and the lower frame 440 and reflect light emitted downwards from the light guide plate 420 to re-direct the light toward the display panel 200, so as to further improve light efficiency.

The reflection sheet 430 may include or be formed of, for example, polyethylene terephthalate ("PET") to achieve reflectivity. One surface of the reflection sheet 430 may be coated with a diffusion layer including, for example, titanium dioxide.

In some exemplary embodiments, the reflection sheet 430 may include or be formed of a material including metal, such as silver (Ag).

The lower frame 440 may accommodate the reflection sheet 430 and the light guide plate 420 therein. The lower frame 440 may include a bottom portion 441, an accommodation portion 442 extending from the bottom portion 441, a lateral wall portion 443 bent from the bottom portion 441 and the accommodation portion 442, and the panel support 444 extending from the lateral wall portion 443 in parallel to the accommodation portion 442.

The bottom portion 441 of the lower frame 440 may be parallel to the light guide plate 420. The accommodation portion 442 may extend from the bottom portion 441 to be disposed in a different plane from that of the bottom portion 441. Upper surfaces of the accommodation portion 442 and the bottom portion 441 on which other elements of the display device are disposed, may be disposed at different distances from the panel support 444 as a common reference. The different distances from the panel support 444 define a height difference between the accommodation portion 442 and the bottom portion 441. The height difference between the accommodation portion 442 and the bottom portion 441 may be substantially equal to a maximum height of a fixation frame 453 of the light source unit 450. Since the accommodation portion 442 is disposed at a lower plane than that of the bottom portion 410 relative to the panel support 444, the accommodation portion 442 may define a recessed portion of the bottom surface of the lower frame 440.

The lateral wall portion 443 of the lower frame 440 may enclose the light guide plate 420, and may extend from the bottom portion 441 and the accommodation portion 442. The panel support 444 may extend from the lateral wall portion 443 of the lower frame 440 while being substantially parallel to both the bottom portion 441 of the lower frame 440 and the accommodation portion 442. The panel support 444 may extend toward a center portion of the bottom portion 441 of the lower frame 440, and the light source 451 may be disposed between the panel support 444 and the accommodation portion 442. That is, a structure in which the panel support 444, the lateral wall portion 443 and the accommodation portion 442 are coupled to each other may have an open loop-shaped cross-section, as illustrated in FIG. 2. The structure in which the panel support 444, the lateral wall portion 443 and the accommodation portion 442 are coupled to each other may have the open loop-shaped cross-section, so as to reflect light emitted from the light source 451.

The lower frame 440 may include or be formed of a rigid metal material, such as stainless steel, and/or a material having good heat dissipation properties, such as aluminum or an aluminum alloy. According to the exemplary embodiment, the lower frame 440 is responsible for maintaining a framework of the display device and protecting a variety of elements accommodated therein. Portions of the lower frame 440 define each of the bottom portion 441, the accommodation portion 442, the lateral wall portion 443 and the panel support 444.

Referring to FIGS. 2 through 4, the light source unit 450 may include the light source 451, the fixation frame 453 accommodated on the accommodation portion 442, the circuit board 452 including the light source 451 mounted thereon and disposed on the fixation frame 453 to cover the accommodation portion 442, a reflective coating layer 455 disposed on the circuit board 452, and the fixation tape 454 disposed on the circuit board 452. The light source unit 450 may be disposed on a single lateral side, two lateral sides, or all of the four lateral sides of the light guide plate 420, but is not limited thereto. Alternatively, the light source unit 450 may be disposed at a corner portion of the light guide plate 420, in consideration of size, luminance, and uniformity of the display panel 200.

The light source 451 may be disposed between the panel support 444 of the lower frame 440 and the circuit board 452. The light source 451 may include at least one LED chip (not illustrated) and a package (not illustrated) which accommodates the LED chip. The light source 451 may have a light emitting surface facing the light guide plate 420. Light generated and emitted from the light source 451 may be blue light.

The fixation frame 453 may be disposed on the accommodation portion 442 of the lower frame 440, and the circuit board 452 may be disposed thereon. The fixation frame 453 may fix the circuit board 452 within the backlight assembly 400 and may dissipate heat generated in the light source 451. The fixation frame 453 may include or be formed of metal having relatively high thermal conductivity, which is favorable to heat dissipation. The fixation frame 453, as illustrated in FIG. 2, may be disposed between the circuit board 452 and the accommodation portion 442.

The circuit board 452 may include the light source 451 mounted thereon, and may be disposed on the fixation frame 453 to cover the accommodation portion 442 of the lower frame 440. The circuit board 452 may be in contact with an end portion of the bottom portion 441 of the lower frame 440. The circuit board 452 may be disposed between the light source 451 and the fixation frame 453. The circuit board 452 having the reflective coating layer 455 disposed thereon may extend to cover the accommodation portion 442 such that light L propagating at the accommodation portion 442 is reflected back toward the light guide plate 420.

In an exemplary embodiment, the reflective coating layer may be omitted. Where the reflective coating layer is omitted from the circuit board 452, the circuit board 452 may include or be formed of metal having relatively high reflectivity so as to reflect the light L as described above. The circuit board 452 may include, for example, a metal printed circuit board. Where the reflective coating layer is omitted and the circuit board 452 includes or is formed of a reflective material such as metal, 455 indicates a reflective surface of the circuit board 452.

The light source 451, the circuit board 452 and the fixation frame 453 may be disposed between the panel support 444 of the lower frame 440 and the accommodation portion 442 of the lower frame 440.

The reflective coating layer 455 may be disposed on the circuit board 452. In detail, the reflective coating layer 455 may reflect light emitted from the light source 451. The reflective coating layer 455 may include or be made of silver (Ag) or aluminum oxide ($Al_2O_3$), which has high reflectivity. Accordingly, the circuit board 452 including the reflective coating layer 455 disposed thereon may reflect light propagating at the accommodation portion 442 of the lower frame 440 back toward the light guide plate 420 or the optical sheet 410, and thus light loss may be reduced or effectively prevented.

Since the circuit board 452 which has a light reflection property covers the accommodation portion 442 of the lower frame 440, a hot spot and light leakage occurring between the light source 451 and the light guide plate 420 may be reduced or effectively prevented.

Referring to FIGS. 4 and 5, the fixation tape 454 may be disposed on the circuit board 452. When the reflective coating layer 455 is formed on the circuit board 452, the fixation tape 454 may be disposed on the reflective coating layer 455. The fixation tape 454 may be disposed between the light guide plate 420 and the circuit board 452 to fix the light guide plate 420 to the circuit board 452.

The circuit board 452 has a length in an extension direction thereof and a width of the circuit board 452 is taken perpendicular to the extension direction. In the extension direction of the circuit board 452, plural fixation tapes 454 and plural light sources 451 alternate with each other. A fixation tape 454 may be disposed between adjacent light sources 451 in the extension direction of the circuit board 452. Where the fixation tape 454 is disposed within a light emission angle of the light source 451, the fixation tape 454 may absorb light emitted from the light source 451. Accordingly, the fixation tape 454 is disposed between the adjacent light sources 451 such as outside of the light emission angle of the light source 451 so as to reduce or effectively prevent light emitted from the light source 451 from propagating through the fixation tape 454 in a path toward the light guide plate 420.

In detail, a length h1 of the fixation tape 454 needs to be less than a width h2 of the circuit board 452. Further, a light emission angle of light emitted from the light source 451 may be about 60 degrees. That is, an angle a1 between a light L2 emitted from the light source 451 and a light L1 emitted to propagate straightforward may be a maximum of about 60 degrees. Accordingly, when the length h1 of the fixation tape 454 satisfies the following Formula 1, the light L2 emitted from the light source 451 may not propagate through the fixation tape 454.

[Formula 1]

$$h1 = d \times \tan(a2)/2$$

In the Formula 1, a2 is 30 degrees and d is a distance between adjacent light sources 451 in an extension direction of the circuit board 452.

Based on the Formula 1, a relationship between the length h1 of the fixation tape 454 and the distance d between the adjacent light sources 451 is determined as follows. That is, the length h1 of the fixation tape 454 may be from about 0.1 to about 0.28 times the distance d between the adjacent light sources 451. When the length h1 of the fixation tape 454 and the distance d between the light sources 451 satisfy the above relationship, the light emitted from the light source 451 may not propagate through the fixation tape 454, and thereby efficiency of light incidence toward the light guide plate 420 may be enhanced.

Hereinafter, another exemplary embodiment of the invention will be described with reference to FIGS. 6 and 7. Configurations of the exemplary embodiment in FIGS. 6 and 7 are substantially the same as those of the exemplary embodiment in FIGS. 1-5 and repeated description of common elements thereof will not be provided for conciseness.

Figure 6:
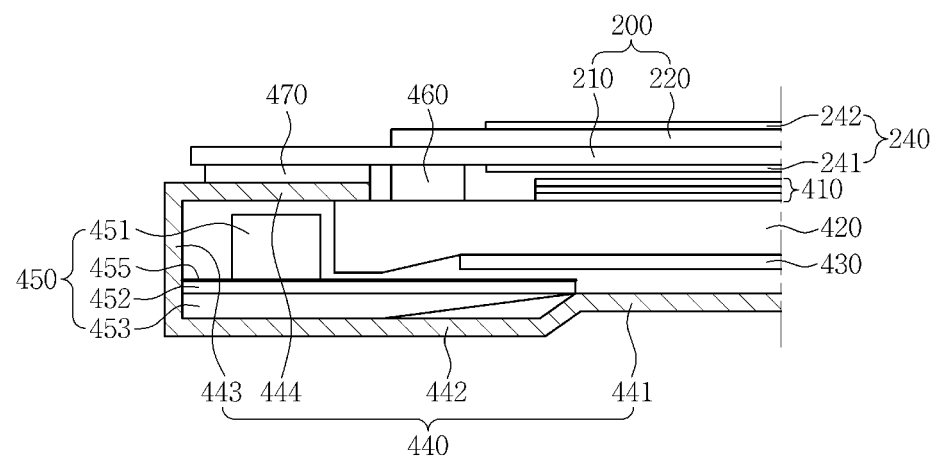
FIG. 6 is a schematic cross-sectional view illustrating another exemplary embodiment of a display device according to the invention.

FIG. 6 is a schematic cross-sectional view illustrating another exemplary embodiment of a display device according to the invention. FIG. 7 is a schematic perspective view illustrating an exemplary embodiment of a light source unit of FIG. 6.

Figure 7:
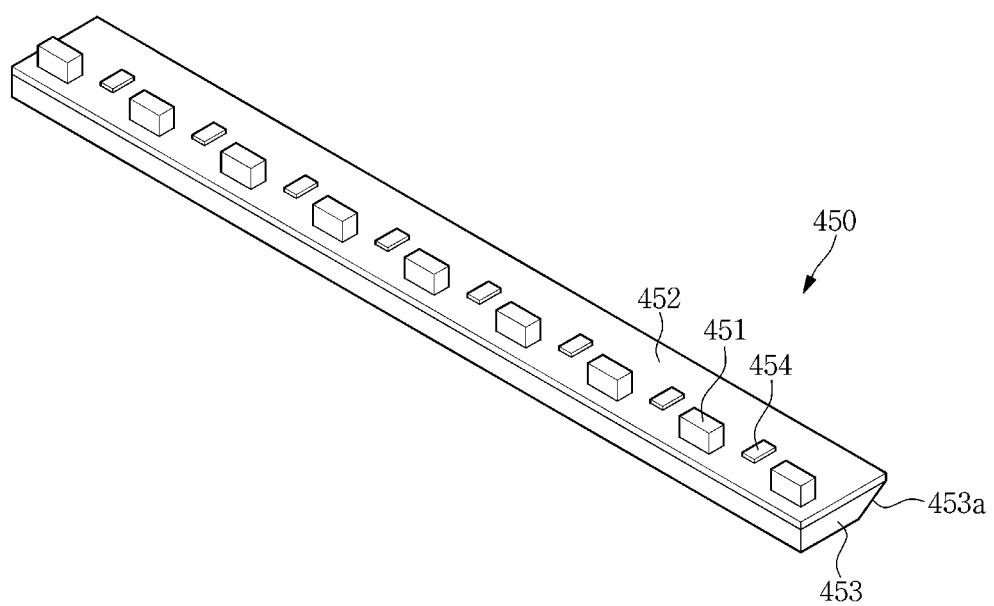
FIG. 7 is a schematic perspective view illustrating an exemplary embodiment of a light source unit of FIG. 6.

Referring to FIGS. 6 and 7, a fixation frame 453 may further include defined thereby an inclined portion 453a extending from a main portion of the fixation frame 453 and toward the bottom portion 441 to form an acute angle with an accommodation portion 442. As further including the inclined portion 453a, the fixation frame 453 may stably support the circuit board 452, and thereby the strength of the display device may be improved.

From the foregoing, it will be appreciated that various exemplary embodiments in accordance with the invention have been described herein for purposes of illustration, and that various modifications may be made without departing from the scope and spirit of the invention. Accordingly, the various exemplary embodiments disclosed herein are not intended to be limiting of the true scope and spirit of the invention. Various features of the above described and other exemplary embodiments can be mixed and matched in any manner, to produce further exemplary embodiments consistent with the invention.

What is claimed is:

1. A display device comprising:
   a display panel which display an image using light;
   a light source which generates the light;
   a circuit board on which the light source is mounted;
   a fixation frame on which the light source and the circuit board are disposed;
   a lower frame on which the display panel is disposed and in which the light source, the circuit board and the fixation frame are disposed; and
   a fixation tape disposed between the light guide plate and the circuit board,
   wherein
   the lower frame defines:
      a bottom portion thereof overlapping the display panel, and
      an accommodation portion thereof extending from an end portion of the bottom portion and on which the light source, the circuit board and the fixation frame are disposed,
   the circuit board extends to cover the accommodation portion,
   the light source is provided in plural on the circuit board, and
   the fixation tape is disposed between adjacent light sources which are mounted on the circuit board.

2. The display device of claim 1, wherein the accommodation portion on which are disposed the light source, the circuit board and the fixation frame is extended in a different plane than that of the bottom portion which overlaps the display panel.

3. The display device of claim 2, wherein the circuit board which covers the accommodation portion is in contact with the end portion of the bottom portion from which the accommodation portion extends.

4. The display device of claim 1, further comprising a light guide plate disposed between the lower frame and the display panel, wherein the light guide plate directs light emitted from the light source toward the display panel.

5. The display device of claim 1, wherein the lower frame further defines:
   a lateral wall portion thereof extended at a first end thereof away from the accommodation portion which is extended from the bottom portion defined by the lower frame; and
   a panel support thereof extending from a second end of the lateral wall portion opposite to the first end thereof, the panel support extended parallel to the accommodation portion.

6. The display device of claim 5, wherein the light source, the circuit board and the fixation frame are each disposed between the panel support and the accommodation portion which is defined by the lower frame.

7. The display device of claim 6, wherein the light source is disposed between the circuit board and the panel support which is defined by the lower frame.

8. The display device of claim 7, wherein the circuit board which covers the accommodation portion is disposed between the light source and the fixation frame.

9. The display device of claim 8, wherein the fixation frame is disposed between the circuit board which covers the accommodation portion and the accommodation portion.

10. The display device of claim 1, wherein in a cross-section, the fixation frame defines an inclined portion thereof extending away from the bottom portion which is defined by the lower frame to form an acute angle with the accommodation portion which is defined by the lower frame.

11. The display device of claim 10, wherein the inclined portion which is defined by the fixation frame is in contact with the end portion of the bottom portion from which the accommodation portion extends.

12. The display device of claim 1, wherein
   a distance between the adjacent light sources mounted on the circuit board is defined in a length direction of the circuit board,
   a length of the fixation tape is taken in a width direction of the circuit board, the width direction perpendicular to the length direction, and
   the length of the fixation tape is from about 0.1 to about 0.28 times the distance between the adjacent light sources mounted on the circuit board.

13. The display device of claim 1, wherein the circuit board comprises a reflective surface disposed in a light emitting direction of the light source which is mounted on the circuit board.

14. The display device of claim 13, further comprising a fixation tape disposed on the reflective surface of the circuit board.

* * * * *